US005125996A

United States Patent [19]

Campbell et al.

[11] Patent Number: 5,125,996

[45] Date of Patent: Jun. 30, 1992

[54] THREE DIMENSIONAL IMAGING PAPER

[75] Inventors: Bruce C. Campbell, Rochester, N.Y.; Barry Crouse, DeCatur, Ga.; Todd M. Spath, Hilton, N.Y.

[73] Assignee: Eastman Kodak Company, Rochester, N.Y.

[21] Appl. No.: 572,588

[22] Filed: Aug. 27, 1990

[51] Int. Cl.[5] ............ B31F 1/07; B32B 3/26

[52] U.S. Cl. ............ 156/196; 156/221; 156/272.2; 162/124; 162/127; 162/164.1; 346/1.1; 346/135.1; 428/156; 428/158; 428/159; 428/206; 428/211; 428/313.5; 428/327; 428/513; 428/537.5; 428/913

[58] Field of Search ............ 162/111, 113, 123-125, 162/127, 129, 164.1; 346/1.1, 135.1; 428/153, 156, 158, 159, 195, 207, 211, 313.5, 327, 537.5, 913, 914, 513; 156/196, 221, 272.2

[56] References Cited

U.S. PATENT DOCUMENTS

| | | | |
|---|---|---|---|
| 3,293,114 | 12/1966 | Kenaga et al. | 162/168 |
| 3,556,934 | 1/1971 | Meyer | 162/169 |
| 3,779,951 | 12/1973 | Streu | 260/2.5 |
| 3,941,634 | 3/1976 | Nisser et al. | 156/79 |
| 4,133,688 | 1/1979 | Sack | 96/87 |
| 4,268,615 | 5/1981 | Yonezawa | 430/320 |
| 4,619,734 | 10/1986 | Andersson | 162/111 |

*Primary Examiner*—Bruce H. Hess

*Attorney, Agent, or Firm*—Robert A. Gerlach

[57] ABSTRACT

Imaging paper having randomly distributed fibers and uniformly dispersed throughout unexpanded synthetic thermoplastic polymeric microspheres, a method of preparation and a method of imparting an image thereto.

14 Claims, 2 Drawing Sheets

FIG. I

THREE DIMENSIONAL IMAGING PAPER

BACKGROUND OF THE INVENTION

1. Field of the Invention

This invention relates to an imaging paper capable of producing a three dimensional visible image in response to stimuli imparted thereto and more particularly to an imaging paper which will expand in accordance with a signal imparted thereto in the form of energy.

2. Description of Related Art

U.S. Pat. No. 3,293,114 issued Dec. 20, 1966 discloses papers useful in packaging, printing, preparation of containers and the like wherein hollow expanded spherical particles are incorporated into the paper pulp by admixture with the wet pulp prior to deposition on the screen. These papers demonstrate increase stiffness and increase caliper.

U.S. Pat. No. 3,556,934 represents a method of making papers similar to that described in U.S. Pat. No. 3,293,114, mentioned above, with the exception that this patent teaches the incorporation of the microspheres in an unexpanded state to the aqueous suspension and during the drying of the paper subjecting it to temperatures sufficient to cause the particles to expand within the paper sheet.

U.S. Pat. No. 3,779,951 issued Dec. 18, 1973 relates to an improved method for the expansion of expandable microspheres in the presence of water.

U.S. Pat. No. 3,941,634 issued Mar. 2, 1976 discloses a method for the preparation of paper containing plastic particles by forming two-spaced apart dewatered webs of cellulose fibers introducing expandable thermoplastic beads between the dewatered webs pressing the spaced apart partially dewatered webs together and subjecting this product to heat to at least partially dry the fibers and at least expand a portion of the beads.

U.S. Pat. No. 4,133,688 issued Jan. 9, 1979 discloses a photographic paper coated with a polyolefin on both sides wherein in the preparation of the paper, either non-inflated microspheres which are subsequently inflated during the drying of the paper or inflated microspheres are added to the pulp during preparation of the paper.

U.S. Pat. No. 4,268,615 issued May 19, 1981 relates to a method of producing a relief by forming a layer of a pattern on the surface of a sheet made of a material having the property of increasing in volume when heated, the pattern being made of the material having a stronger ability to absorb light than the aforesaid material, and then radiating a strong light uniformly on the entire surface of the sheet to selectively heat the portion of the sheet adjacent the undersurface of the pattern layer whereby the pattern layer is raised from the sheet surface. The sheet is prepared by mixing microcapsules and a binder such as vinyl acetate polymers.

SUMMARY OF THE INVENTION

The invention provides a paper which is capable of producing a visible image by expansion of the caliper of the paper in accordance with the image to be recorded, by incorporating into a dry cellulosic fiber paper at least 20 percent by weight of unexpanded synthetic thermoplastic polymeric microspheres the particle size thereof being from about 5 to 20 micrometers in the unexpanded condition. By imparting to such papers a signal in the form of a heat pattern, the caliper or thickness of the paper will expand in areas heated above the expansion temperature of the microcapsules thus providing a recorded image. The invention herein is useful in many and varied applications. For example, the paper products may be utilized for three dimensional color or black and white photographs, for producing documents in braille, for providing specific images in a relief format, such as, security or official documents having a unique stamp or logo, for the preparation of various crafts including applications such as paint by numbers wherein various portions of the image have different textures and relief, for games for children wherein they can make different images akin to that done in woodburning wherein a heating pen can be employed to expand the microcapsules in various locations in order to provide art works, for preparing disposable printing plates for the offset printing process, for producing contour maps for enhancing 2-dimensional images obtained by thermography or ultrasound, and the like. An important utility of the paper products in accordance with this invention is together with light sensitive photographic layers to provide three-dimensional images.

DESCRIPTION OF THE PREFERRED EMBODIMENTS

The invention provides a paper which is capable of being imaged by applying thereto by any suitable means a heat image. The heat image may be applied by a contact element which imparts heat to specific portions of the paper in accordance with the information desired to be stored within the paper. The information may be imparted to the paper by utilizing a scanning laser beam which is modulated in accordance with the image to be stored in the paper, thus causing discrete areas of the paper to expand in order to impart thereto a visual image whether it be a company logo, information stored as braille, or the like. A heat pen such as a woodburning apparatus or the like may be employed in order to write information into the paper in accordance with this invention. A particularly suitable utility is in the preparation of high quality letterhead and business cards wherein the raised portions together with printing indicia give the desired effect.

Figure 1:
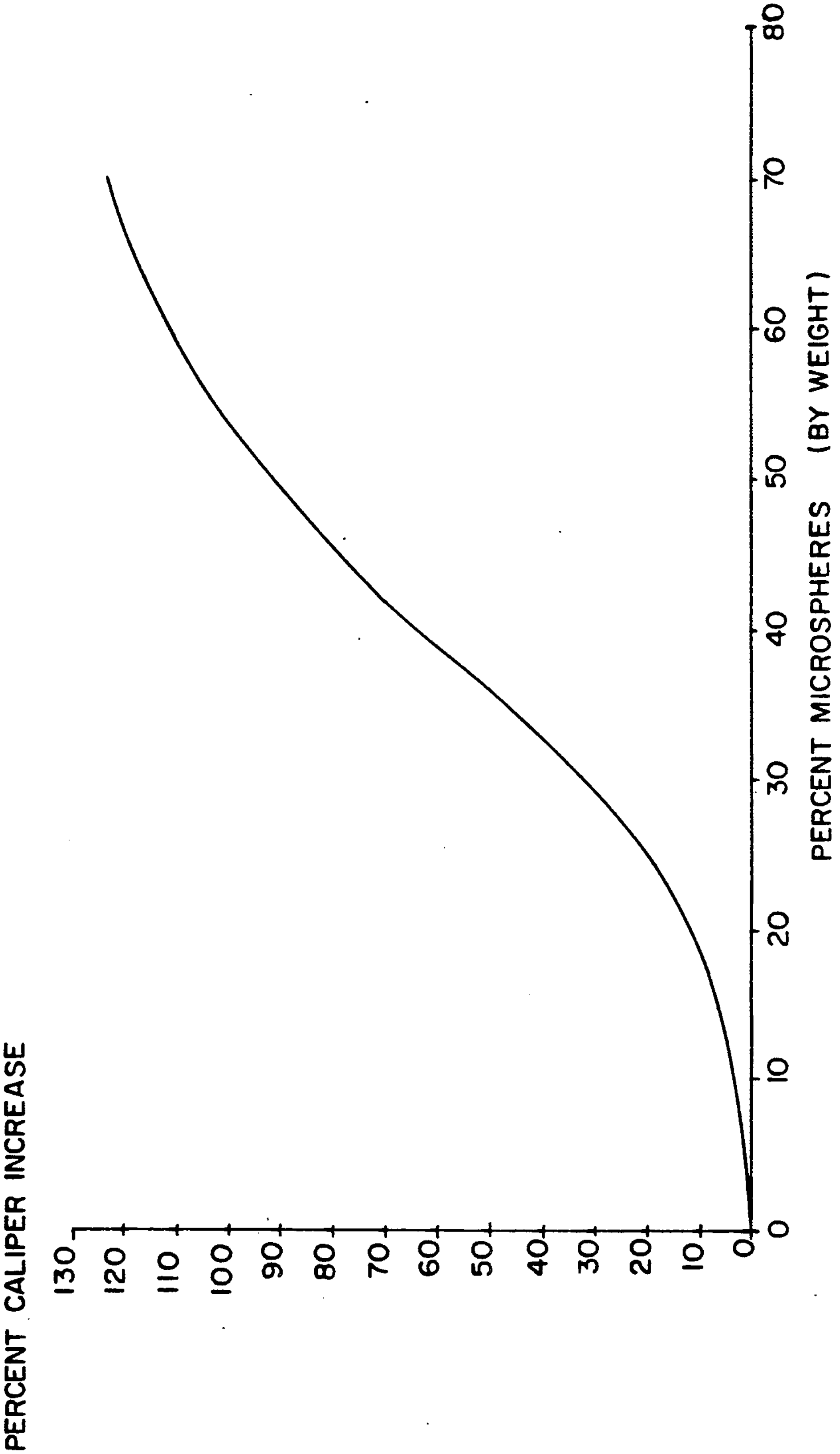
FIG. 1 is a graph illustrating the increase in caliper of a cellulose paper verses the percentage by weight of microspheres incorporated in the paper.

Imaging paper, in accordance with this invention, is prepared by incorporating suitable expandable microspheres in the pulp slurry after the refining of the fibers when the customary addenda are added to the raw material. The paper pulp including the expandable microspheres and other addenda, used in the formulation of the paper are deposited onto a screen where a substantial portion of the water is extracted. The web, which at this time has some wet strength, is dried to a further degree by utilizing temperatures which are substantially less than that required in order to expand the microspheres. The microspheres are incorporated into the paper in an amount of at least 20 percent by weight preferably from about 30 to about 70 percent by weight and most preferably from about 35 to about 60 percent by weight as this percentage yields an increase in caliper of the paper in an amount of from about 15 to about 120 percent based on the original thickness of the paper prior to expansion. This can be readily seen by observing the graph shown in FIG. 1 wherein at 20% the increase is about 15% and at 70% the increase is slightly greater than 120%. An increase of at least about 30% which takes place at a loading of 30 weight percent of the particular microspheres employed in determining the curve of FIG. 1, is preferred. Generally, the greater the increase in caliper occurs at the higher range of loading and this is most preferred.

Any suitable unexpanded synthetic thermoplastic polymeric microspheres may be included in the paper making procedures in accordance with this invention such as any of those unexpanded microspheres disclosed in the patents previously mentioned herein. Particularly suitable microspheres are those prepared from a thermoplastic copolymer of vinylidene chloride and acrylonitrile containing liquid isobutane in the unexpanded state. The microspheres should have a particle size of from about 5 to about 20 micrometers and preferably from about 10 to about 15 micrometers and expand to an average size of about 20 to 80 micrometers in the fully expanded state. It is preferred that the temperature of actuation of the expansion operation of the microparticles take place at a temperature of at least about 70° C., preferably at a temperature to about 70° C. to 100° C.

In the preparation of the imaging paper in accordance with this invention other known ingredients may be incorporated into the furnish in addition to the cellulose fibers and the microspheres, including strengthening agents, sizing agents, coloring agents, whiting agents, optical brighteners and the like. Further, the paper may be externally sized in accordance with procedures widely known in the art. Finally, if desired, the paper may be coated with polyolefin resins which is a known procedure in the photographic paper making art.

Suitable strengthening agents include resins such as amino-aldehyde or polyamide-epichlorohydrin resins which will increase the wet strength of the paper and, dry strength increasing agents such as starches, including both ordinary starch and cationic starch or polyacrylamide resins. Preferably, the amino-aldehyde and polyamine-epichlorohydrin and polyacrylamide resins are used in combination as described in U.S. Pat. No. 3,592,731.

Other conventional additives include water soluble gums, for example, cellulose ethers such as carboxymethyl cellulose, sizing agents, for example, alkyl ketene dimer, sodium stearate that is precipitated onto the pulp fibers with a polyvalent metal salt such as alum, aluminum chloride or aluminum sulfate; fluorescing agents; antistatic agents; fillers, including clays or pigments, dyes and the like.

Any suitable optical brightening agents may be included in the paper such as those described in *Research Disclosure,* Issue No. 308, December 1989, Publication 308119, paragraph 5, page 998 (incorporated herein by reference). Should the paper in accordance with this invention be employed as a substrate for the preparation of photographic light-sensitive elements, it may be desirable to coat one or both the surfaces of the paper with a polyolefin layer in order to render the paper somewhat more water resistant during processing of the photographic element. Suitable polyolefin materials for this purpose and the manner of application to paper surfaces is taught in U.S. Pat. No. 4,794,071 which is incorporated herein by reference.

The imaging paper in accordance with this invention having at least one silver halide emulsion layer thereon is applicable for use in the preparation of three-dimensional images for art work and other purposes. The paper can be expanded in accordance with a heat image which corresponds to a visible image that is recorded in the photographic silver halide emulsion layers applied to the paper in order to achieve various affects. In this regard, any of the known silver halide emulsion layers, such as those described in *Research Disclosure,* Vol. 176, December 1978, Item 17643 and *Research Disclosure,* Vol. 225, January 1983, Item 22534, the disclosures of which are hereby incorporated by reference in their entirety, are useful in preparing photographic elements in accordance with this invention.

Figure 2:
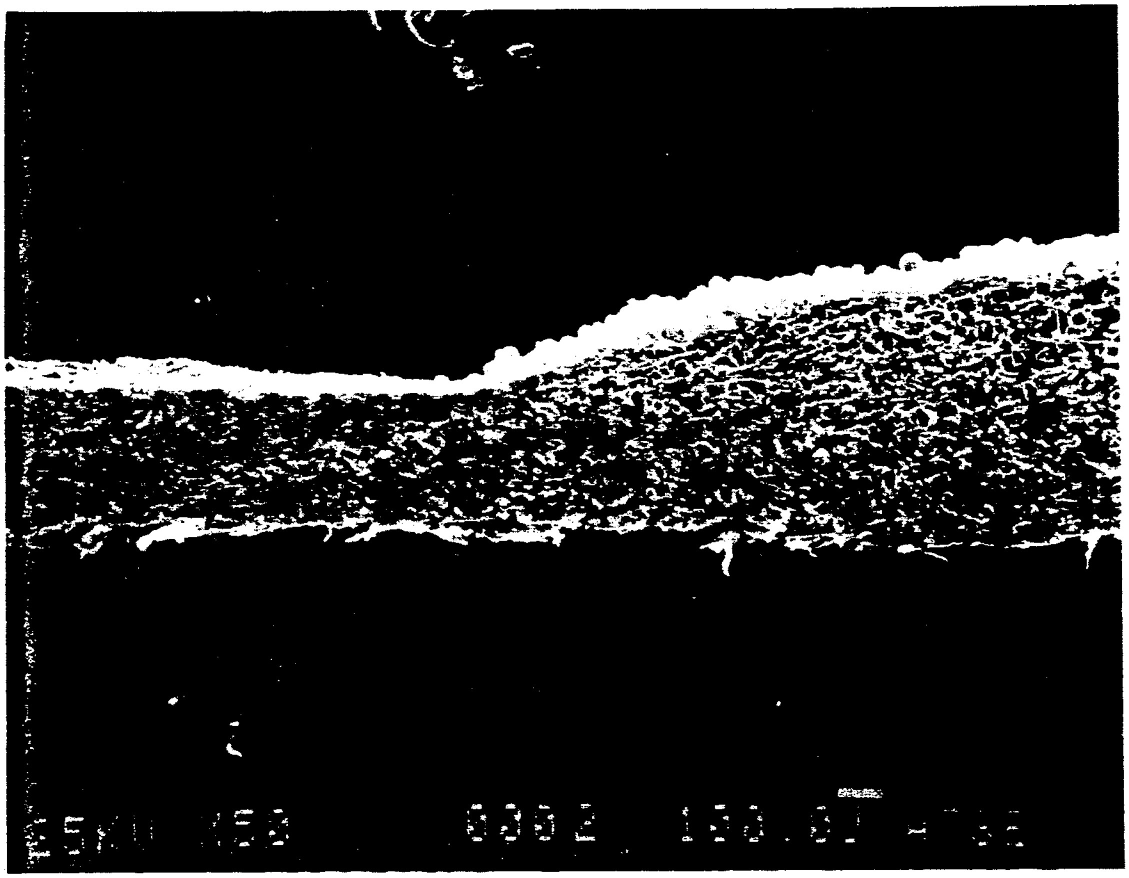
FIG. 2 is a photomicrograph of a paper prepared in accordance with this invention wherein one portion is in the unexpanded form while the other is in the expanded form.

Referring now specifically to FIG. 2, it is noted that the paper in accordance with this invention at the left side of the photomicrograph is in the unexpanded state. The portion of the paper to the right side of the micrograph demonstrates the increased caliper of the paper upon heating the paper in that particular portion. It is noted that while the microspheres are distributed throughout the entire cross-section of the paper that numerous spheres are present at the top surface which is most apparent in the expanded portion of the micrograph. The top surface of the micrograph is that surface of the paper which was applied to the wire in the paper making operation. The portion on the right side of the micrograph was heated by means of a metal template heated to 100° C. and brought into contact with the paper for 3 to 5 seconds. As indicated previously other means for heating the paper and bringing about the expansion of the microbeads uniformly disposed throughout the paper may be employed including heating by more sophisticated means such as electronically controlled resistance elements as employed in thermal printer heads. Further, non-contact heating can be brought about by utilization of both argon and carbon dioxide lasers which are modulated in accordance with the information desired to be imparted to the imaging element. When using a far-infared $CO_2$ laser a power density of about 25 watts/cm$^2$ gives satisfactory expansion of the spheres with laser pulses of 80 to 250 milliseconds. An argon laser can be employed in conjunction with an imaging paper in accordance with this invention wherein a magenta dye is employed to enhance the green light absorption. Water soluble vegetable dye, color emulsion dye couplers and inorganic dyes are effective in this regard. Green dye material can be used in conjunction with near-infared laser diode.

The micrograph illustrated in FIG. 2 contains 50% by weight of microspheres and the enlarged portion to the right of the micrograph demonstrates a relief of 100 to 200% greater than that of the paper prior to expansion of the microspheres. The scanning electron micrograph shown in FIG. 2 demonstrates that the microspheres in this instance expanded primarily toward the wire side of the paper, however, this depends upon the manner in which the pulp is fed into the screen. While the applicants herein do not wish to be bound by any theory with regard to the manner in which expansion of the microspheres takes place within the paper, it is believed that the microspheres are mechanically entrapped within the paper because of the fiberous nature thereof and that at the higher concentrations of the microspheres larger increase in caliper occur. The scanning electron micrograph as shown in FIG. 2 demonstrates a gradual rise at the edge of the relief image when heated with a template. A sharp edge was produced with the use of a laser. This relief pattern is further demonstrated with regard to papers coated with polyolefin layers including both polyethylene and polyolefin wherein the coverage is between 0.5 and 2 pounds per 1,000 square feet of paper.

The invention will be further illustrated in accordance with the following examples in which parts and percentages are by weight unless otherwise specified:

EXAMPLE I

Paper hand sheets are prepared in accordance with the following general procedure:

A wood pulp furnish containing 65% hardwood Kraft pulp and 35% softwood sulfite pulp is refined in a Valley Beater to a slowness of about 30 seconds as measured by TAPPI Standard Williams Slowness Test and has a consistency of 1.9% pulp.

To this stock slurry is added 0.5 percent of $AlCl_3$. This slurry is used as a master batch to make handsheets, A, B, C, D and E, each of which weigh about 3 grams. Two handsheets are made for each designation A, B, C, etc. in a British Hand Sheet mold and then pressed to further remove water.

Expancel microspheres sold by Nobel Industries of Sweden are added prior to pouring the slurry into the mold in the weight percentage indicated in the Table. These microspheres are white spherical particles having a mean diameter of 10-15 micrometers. The shell is a copolymer of vinylidene chloride and acrylonitride and the spheres contain liquid isobutane. Each handsheet is dried in an air oven at 112° F. (44.4° C.). The caliper of each dried handsheet is measured at five different locations chosen at random thus giving 10 data points for each concentration of microspheres, 5 for each handsheet.

Each handsheet is then heated for 45 minutes in a dry oven at 214° F. (100° C.) and then measured to determine the caliper by measurement each sheet in the same five places as done previously.

The conditions, concentration and measurements are set forth in the following Table:

TABLE

| Handsheet | Weight Percent Microspheres | Original Average Caliper Mils | Average Caliper After Heating Mils | Percent Change |
|---|---|---|---|---|
| A 1 (Control) | 0 | 8.99 | 8.82 | (−1.9) |
| A 2 (Control) | 0 | 9.05 | 8.90 | (−1.7) |
| B 1 (Control) | 11 | 9.57 | 9.69 | 1.3 |
| B 2 (Control) | 11 | 9.27 | 9.28 | 0.1 |
| C 1 (Control) | 26 | 9.19 | 10.71 | 16.5 |
| C 2 (Control) | 26 | 8.84 | 10.44 | 18.1 |
| D 1 | 54 | 6.99 | 13.93 | 99.3 |
| D 2 | 54 | 7.20 | 15.20 | 111.1 |
| E 1 | 70 | 4.31 | 9.63 | 123.4 |
| E 2 | 70 | 4.59 | 10.20 | 122.2 |

EXAMPLE 2

To about 5 gallons of a commercially prepared pulp stock prepared from 65% hardwood Kraft pulp and 35% softwood sulfite pulp refined through a double disc refiner and a Jordan is added several functional chemicals to obtain optical, wet, and dry strength. These chemicals are commercially available and are sold under trade designations Kymene, Accostrength and under generic names, stearic acid and aluminum chloride. This slurry is used as a masterbatch in the preparation of 36 inches long by 8 inches side handsheet.

EXAMPLE 2A 700 ml of the above-described masterbatch slurry containing 29.4 gms of pulp, diluted to 12 liters are distributed on the screen of a Formette Dynamique paper making apparatus, the screen of which is rotated at 888 meters/minute and the slurry is applied at a pressure of 2 bar, all of the slurry being applied in 47 passes. The wet web is couched 10 times between metal plates having a blotter disposed on either side of the wet web. The web is then drum dried at 135° F., 15 psig for 30 minutes with a dry Teflon sheet on the felt side and three blotters on the screen side. The caliper is measured as 0.006 inch. The sheet is then heated in an oven at 152° C. for 15 minutes and exhibits a caliper of 0.007 inch.

EXAMPLE 2B

The procedure of Example 2A is repeated, however, 60 ml of an aqueous dispersion of 30 grams of Expancel microspheres are added to the stock prior to dilution. The average caliper of the sheet, taken at 4 different locations is 0.014 inch. The average caliper after heating at 115° C. for 15 minutes is 0.027 inch.

A repeat of Example 2B indicates a caliper before and after heating of 0.012 inch and 0.030 inch, respectively.

EXAMPLE 3

A brass template in the form of a Kodak logo (Capital letter K) is placed on a hot plate and heated to 100° C. A handsheet prepared as in Example 2B is laid over the template and held in intimate contact for 3-5 seconds by means of a soft padded block. A well defined image corresponding to the template is observed.

EXAMPLE 4

A 75 watt $CO_2$ laser set at the minimum power level of 1.8 watts is used to address a handsheet prepared as in Example 2B. The laser beam is defocused to cover a 3 mm diameter spot to avoid burning the paper. Laser pulses of 80 and 250 microseconds duration are applied to paper resulting in well defined expansion.

EXAMPLE 5

A handsheet prepared in accordance with Example 2B is placed in the wave guide of a microwave power amplifier and subjected to doses of 3000 watts for 4 seconds. An expansion of nearly 400% resulted.

It should be understood that any technique for addressing, heating and causing the expansion of the microspheres may be employed throughout the examples for the particular means recited.

What is claimed is:

1. An imaging paper capable of producing a visible image in response to stimuli imparted thereto in image configuration which comprises a dry sheet of randomly distributed cellulosic paper making fibers having uniformly dispersed throughout at least 20 percent by weight of unexpanded synthetic thermoplastic polymeric microspheres, said microspheres having a particle size in the unexpanded condition of from 5 to 20 micrometers and in the expanded condition of 20 to 80 micrometers.

2. The imaging paper of claim 1 wherein the microspheres are present in the amount of from about 30 weight percent to about 70 weight percent.

3. The imaging paper of claim 1 wherein the microspheres are present in the amount of from about 35 weight percent to about 65 weight percent.

4. The imaging paper of claim 1 wherein the particle size of the unexpanded microspheres is from about 10 to about 15 micrometers.

5. The imaging paper of claim 1 wherein a layer of polyolefin is disposed on at least one surface.

6. A method of imparting indicia to an imaging paper of claim 1 which comprises addressing the imaging paper in a predetermined pattern whereby selected areas of the paper are heated above the temperature of expansion of the microspheres and cooling the selected areas.

7. The method of claim 6 wherein the selected areas of the paper are heated to at least 70° C.

8. The method of claim 6 wherein the selected areas of the paper are heated to at least 100° C.

9. The method of claim 6 wherein the selected areas are heated for a time sufficient to expand the microspheres.

10. A method of making an imaging paper comprising refining paper making pulp, to form an aqueous slurry, adding to the slurry at least about 20 percent by weight of unexpanded synthetic thermoplastic polymeric microspheres, forming a paper by uniformly distributing the slurry and separating water and drying the thus formed paper at a temperature below the expansion temperature of the microspheres.

11. The method of claim 10 wherein from about 30 percent by weight to about 70 percent by weight of microspheres are incorporated in the slurry.

12. The method of claim 10 wherein from about 35 percent by weight to about 65 percent by weight of microspheres are incorporated in the slurry.

13. The method of claim 10 wherein the microspheres have a particle size of from about 5 to 20 micrometers.

14. The method of claim 10 wherein the microspheres have a particle size of from about 10 to 15 micrometers.

* * * * *